US011027617B2

(12) United States Patent
Shindo et al.

(10) Patent No.: US 11,027,617 B2
(45) Date of Patent: Jun. 8, 2021

(54) CONTROL METHOD FOR ELECTRICALLY DRIVEN VEHICLE AND CONTROL DEVICE FOR ELECTRICALLY DRIVEN VEHICLE

(71) Applicant: NISSAN MOTOR CO., LTD., Yokohama (JP)

(72) Inventors: Ikuma Shindo, Kanagawa (JP); Tatsuya Suzuki, Kanagawa (JP); Naoki Miyashita, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 52 days.

(21) Appl. No.: 16/479,640

(22) PCT Filed: Jan. 19, 2018

(86) PCT No.: PCT/JP2018/001672
§ 371 (c)(1),
(2) Date: Jul. 22, 2019

(87) PCT Pub. No.: WO2018/139375
PCT Pub. Date: Aug. 2, 2018

(65) Prior Publication Data
US 2021/0001730 A1    Jan. 7, 2021

(30) Foreign Application Priority Data

Jan. 24, 2017  (JP) .............................. JP2017-010568

(51) Int. Cl.
*B60L 15/20* (2006.01)
*B60W 10/08* (2006.01)

(52) U.S. Cl.
CPC .......... *B60L 15/2009* (2013.01); *B60W 10/08* (2013.01); *B60L 2240/12* (2013.01);
(Continued)

(58) Field of Classification Search
CPC .......... B60L 15/2009; B60L 2240/423; B60L 2240/421; B60L 2250/28; B60L 2240/12;
(Continued)

(56) References Cited

U.S. PATENT DOCUMENTS

2014/0350759 A1* 11/2014 Kobayashi ...... B60W 30/18127
701/22
2016/0347202 A1   12/2016 Sawada et al.
2018/0154797 A1    6/2018 Sawada et al.

FOREIGN PATENT DOCUMENTS

JP    2000-205015 A    7/2000
JP    2009-303342 A   12/2009
WO   WO-2016/189670 A1 12/2016

* cited by examiner

*Primary Examiner* — Michael V Kerrigan
(74) *Attorney, Agent, or Firm* — Faegre Drinker Biddle & Reath LLP

(57) ABSTRACT

An electrically driven vehicle includes a motor configured to supply the vehicle with a braking force or a driving force corresponding to an accelerator operation amount. The braking force is controlled when the accelerator operation amount is less than a predetermined value and the driving force is controlled when the accelerator operation amount is the predetermined value or more. A torque target value at which the motor is caused to output a braking or driving torque corresponding to the accelerator operation amount is calculated. A disturbance torque acting on the motor as a resistance corresponding to a road surface gradient is estimated, and a correction to remove the disturbance torque from the torque target value is performed. The correction amount is reduced in a downhill road when the accelerator operation amount is less than the predetermined value and a vehicle speed is larger than a predetermined vehicle speed.

6 Claims, 12 Drawing Sheets

(52) U.S. Cl.
CPC ... *B60L 2240/421* (2013.01); *B60L 2240/423* (2013.01); *B60L 2250/28* (2013.01); *B60Y 2200/91* (2013.01)

(58) Field of Classification Search
CPC .... B60L 15/20; B60L 7/14; B60L 9/18; B60L 2240/642; B60L 15/2018; B60L 15/2081; B60L 50/51; B60W 10/08; B60W 2710/083; B60Y 2200/91; B60Y 2200/92; Y02T 10/64; Y02T 10/72; Y02T 90/40
See application file for complete search history.

CONTROL METHOD FOR ELECTRICALLY DRIVEN VEHICLE AND CONTROL DEVICE FOR ELECTRICALLY DRIVEN VEHICLE

TECHNICAL FIELD

The present invention relates to a control method for an electrically driven vehicle and a control device for an electrically driven vehicle.

BACKGROUND ART

Conventionally, in an acceleration-deceleration control system for a vehicle, there has been known a technology in which a deceleration is controlled in accordance with an accelerator operation amount when the accelerator operation amount is less than a predetermined value, and an acceleration is controlled in accordance with the accelerator operation amount when the accelerator operation amount is the predetermined value or higher (see JP 2000-205015). In the acceleration-deceleration control system, a target acceleration/deceleration can be set in accordance with the magnitude of a road surface gradient corresponding to the accelerator operation amount so as to eliminate the influence of the road surface gradient, and therefore, even in a gradient road, an accelerator operation amount at which the target acceleration/deceleration is set to zero can maintain a uniform vehicle speed without requiring adjustment of the accelerator operation amount.

SUMMARY OF INVENTION

Here, in the technology disclosed in Patent Literature 1, in order to restrain the acceleration/deceleration and a change in speed caused due to a change of the road surface gradient on which a vehicle travels, the target acceleration/deceleration is corrected to eliminate the influence of the road surface gradient in accordance with the magnitude of the road surface gradient. Accordingly, from experience, a driver considers that a deceleration caused in the vehicle in a downhill gradient is smaller than that of a flat road, but the target acceleration/deceleration is corrected to eliminate the influence of the downhill gradient, so that the deceleration is caused similarly to the flat road, thereby resulting in that the driver might have an uncomfortable feeling.

The present invention is intended to provide a technology to reduce a gradient correction amount in a downhill gradient (a downhill road) so as to restrain a driver from having an uncomfortable feeling.

A control method for an electrically driven vehicle of this invention includes a motor configured to supply the vehicle with a braking force or a driving force corresponding to an accelerator operation amount. The control method is for controlling the braking force when the accelerator operation amount is less than a predetermined value and controlling the driving force when the accelerator operation amount is the predetermined value or more. In the control method, a torque target value at which the motor is caused to output a braking/driving torque corresponding to the accelerator operation amount is calculated, a disturbance torque acting on the motor as a resistance corresponding to a road surface gradient is estimated, a correction to remove the disturbance torque from the torque target value is performed, and the motor is controlled in accordance with the torque target value subjected to the correction. A correction amount in the correction is reduced in a downhill road when the accelerator operation amount is less than the predetermined value and a vehicle speed is larger than a predetermined vehicle speed.

DESCRIPTION OF EMBODIMENTS

The following describes an example in which a control device for an electrically driven vehicle according to the present invention is applied to an electric vehicle using an electromotor (hereinafter referred to as an electric motor or just a motor) as a drive source.

One Embodiment

Figure 1:
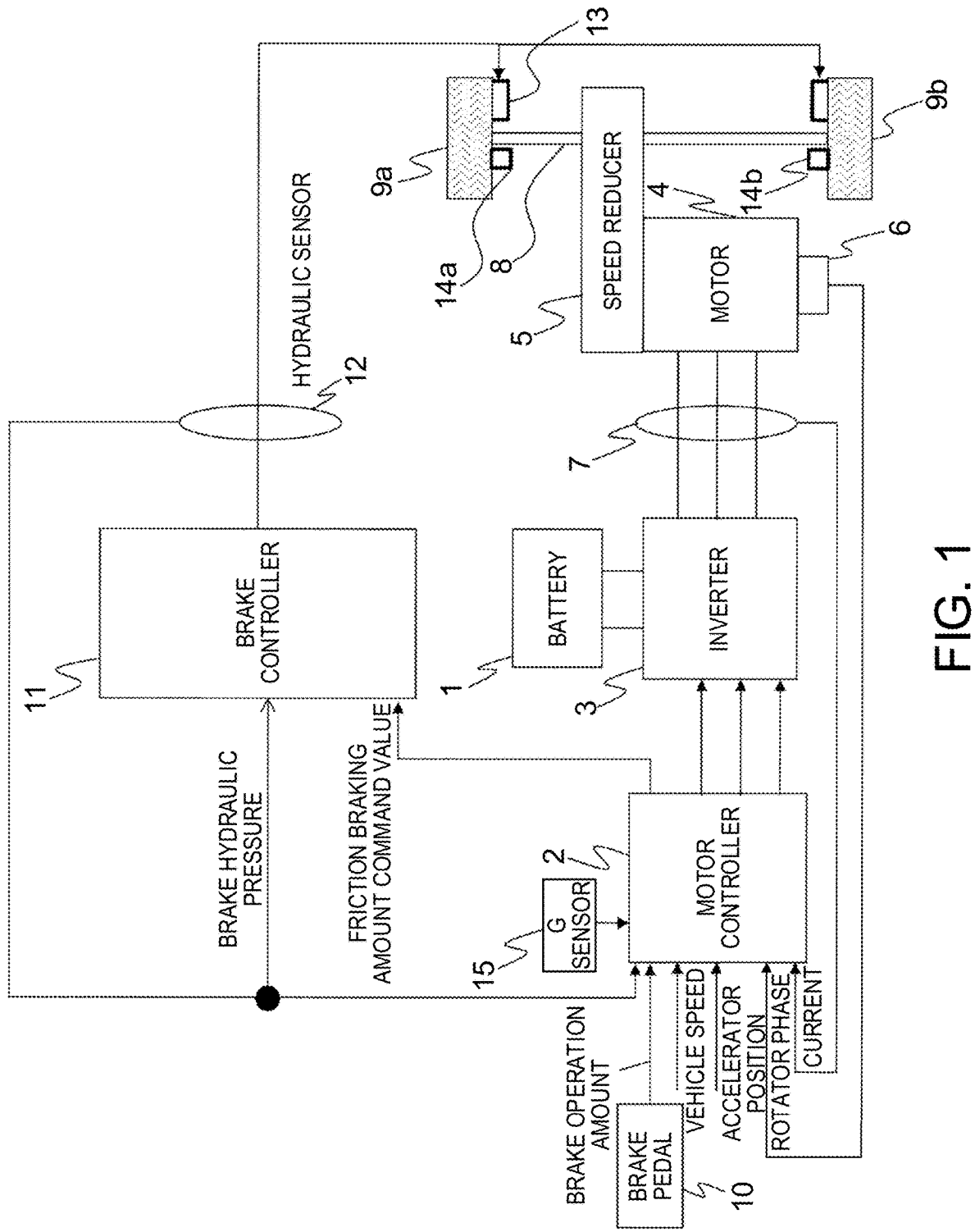
FIG. 1 is a block diagram illustrating a main configuration of an electric vehicle including a control device for an electrically driven vehicle in one embodiment.

FIG. 1 is a block diagram illustrating a main configuration of an electric vehicle including a control device for an electrically driven vehicle in one embodiment. The control device for the electrically driven vehicle according to the present invention includes an electric motor 4 as a part or all of a drive source for the vehicle and is applicable to an electrically driven vehicle that can travel by a driving force of the electric motor. The electrically driven vehicle includes not only an electric vehicle, but also a hybrid vehicle and a fuel-cell vehicle. Particularly, the control device for the electrically driven vehicle in the present embodiment can be applied to a vehicle that can control acceleration and deceleration or stop of the vehicle only by the operation of an accelerator pedal. At the time of acceleration, a driver in the vehicle steps on the accelerator pedal, and at the time of deceleration or stop, the driver reduces a stepping amount of the accelerator pedal stepped by the driver or reduces the stepping amount of the accelerator pedal to zero. Note that, in an uphill road, in order to prevent a backward motion of the vehicle, the vehicle may approach a stop state while the driver is stepping on the accelerator pedal, in some cases.

Signals indicative of a vehicle state such as a vehicle speed V, an accelerator position (accelerator opening degree) θ, a rotator phase α of the motor (three-phase alternating motor) 4, and three-phase alternating currents iu, iv, iw of the motor 4 are input into a motor controller 2 as digital signals. The motor controller 2 generates a PWM signal for controlling the motor 4 based on the input signals. Further, the motor controller 2 controls a switching element of an inverter 3 to open and close in response to the PWM signal thus generated. The motor controller 2 further generates a friction braking amount command value in accordance with an accelerator operation amount by the driver or an operation amount of a brake pedal 10.

The inverter 3 turns on/off two switching elements (e.g., power semiconductor elements such as IGBT or MOS-FET) provided for each phase so as to convert a direct current supplied from a battery 1 into an alternating current and introduces a desired current into the motor 4.

The motor 4 generates a driving force by the alternating current supplied from the inverter 3 and transmits the driving force to right and left driving wheels 9a, 9b via a speed reducer 5 and a drive shaft 8. Further, when the motor 4 rotates following the driving wheels 9a, 9b at the time when the vehicle travels, the motor 4 generates a regenerative driving force so as to recover a kinetic energy of the vehicle as an electric energy. In this case, the inverter 3 converts, into a direct current, an alternating current generated at the time of a regenerative operation of the motor 4 and supplies it to the battery 1.

A current sensor 7 detects three-phase alternating currents Iu, Iv, Iw flowing into the motor 4. Note that, since the sum of the three-phase alternating currents Iu, Iv, Iw are zero, currents of given two phases may be detected, and a current of remaining one phase may be found by calculation.

A rotation sensor 6 is a resolver or an encoder, for example, and detects the rotator phase α of the motor 4.

A brake controller 11 outputs, to a friction brake 13, a brake actuator command value for generating a brake hydraulic pressure corresponding to the friction braking amount command value generated by the motor controller 2.

A hydraulic sensor 12 detects a brake hydraulic pressure of the friction brake 13 and outputs the detected brake hydraulic pressure to the brake controller 11 and the motor controller 2.

The friction brake 13 is provided for each of the right and left driving wheels 9a, 9b and generates a braking force in the vehicle by pressing a brake pad against a brake rotor in accordance with the brake hydraulic pressure.

Note that, in a case where a maximum regenerating brake torque is insufficient from a braking torque intended by the driver and calculated from the accelerator operation amount, the vehicle speed, and so on, the friction braking force generated by the friction brake 13 functions as a braking force used in response to the friction braking amount command value output from the motor controller 2. Further, the friction braking force is also used in a case where the braking force intended by the driver is smaller than the maximum regenerating brake torque or in a case where regenerative power is restricted due to full charge of the battery 1, heating protection of the motor 4, or the like and a desired braking force for the driver cannot be covered only by the regenerating brake torque. Further, the friction braking force is used not only in a case where the friction braking force is requested in accordance with the accelerator operation amount, but also in a case where a desired braking force is to be achieved by an operation amount of the brake pedal by the driver.

A longitudinal G sensor 15 mainly detects a longitudinal acceleration and outputs a detection value to the motor controller 2. Hereby, the motor controller 2 can calculate a disturbance torque component generally matching a gradient resistance acting on the motor 4, based on the longitudinal-G-sensor detection value.

Figure 2:
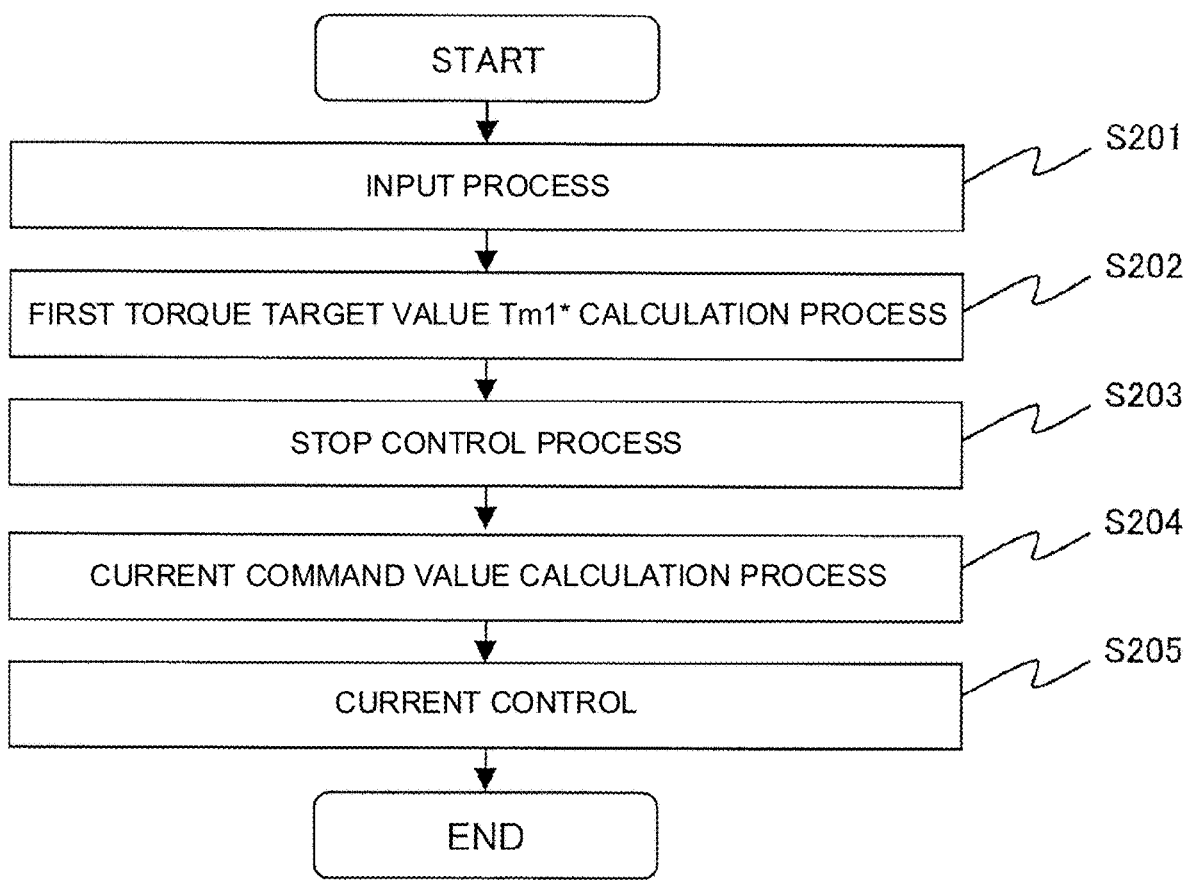
FIG. 2 is the procedure of a process of a motor current control performed by a motor controller included in the control device for the electrically driven vehicle in one embodiment.

FIG. 2 is a flowchart illustrating the procedure of a process of a motor current control programmed to be executed by the motor controller 2.

In step S201, signals indicative of the vehicle state are input into the motor controller 2. Herein, the vehicle speed V (m/s), the accelerator position θ (%), the rotator phase α (rad) of the motor 4, a rotation speed Nm (rpm) of the motor 4, the three-phase alternating currents iu, iv, iw flowing into the motor 4, a direct-current voltage value $V_{dc}$ (V) between the battery 1 and the inverter 3, a brake application amount, and a brake hydraulic pressure are input.

The vehicle speed V (km/h) is a wheel speed of tire-wheel assemblies (the driving wheels 9a, 9b) configured to transmit a driving force at the time of driving the vehicle, for example. The vehicle speed V is acquired from wheel speed sensors 11a, 11b or other controllers (not shown) via communication. Alternatively, the vehicle speed V (km/h) is found in such a manner that a motor rotation speed ωm is multiplied by a tire dynamic radius r, and a resultant value is divided by a gear ratio of a final gear to find a vehicle speed v (m/s), and the vehicle speed v (m/s) is multiplied by 3600/1000 for unit conversion.

The accelerator position θ (%) is acquired, as an index indicative of the accelerator operation amount by the driver, from an accelerator position sensor (not shown) or acquired from other controllers (not shown) such as a vehicle controller via communication.

The rotator phase α (rad) of the motor 4 is acquired from the rotation sensor 6. The rotation speed Nm (rpm) of the motor 4 is found in such a manner that a rotator angular velocity ω (electric angle) is divided by the number of pole pairs p of the motor 4 to find a motor rotation speed com (rad/s) that is a mechanical angular velocity of the motor 4, and the motor rotation speed ωm thus found is multiplied by 60/(2 π). The rotator angular velocity ω is found by differentiating the rotator phase α.

The three-phase alternating currents iu, iv, iw (A) flowing into the motor 4 are acquired from the current sensor 7.

The direct-current voltage value $V_{dc}$ (V) is found from a power supply voltage value sent from a voltage sensor (not shown) provided in a direct-current power supply line between the battery 1 and the inverter 3 or a battery controller (not shown).

The brake application amount is acquired from a brake hydraulic sensor value detected by the hydraulic sensor 12. Alternatively, a detection value (a brake operation amount) detected by a stroke sensor (not shown) or the like configured to detect a stepping amount of the brake pedal by a pedal operation of the driver may be used as the brake application amount.

In a torque target value calculation process of step S202, the motor controller 2 sets a first torque target value Tm1*. More specifically, first, a basic torque target value Tm0* (torque target value) as a driver request torque is set by referring to an accelerator position-torque table illustrated in FIG. 3 that illustrates one aspect of a driving force characteristic calculated in accordance with the accelerator position θ and the motor rotation speed com input in step S201.

Subsequently, a disturbance-torque estimated value Td generally matching a gradient resistance is found. Then, by adding the disturbance-torque estimated value Td as a gradient correction torque to the basic torque target value Tm0*, the first torque target value Tm1* in which a gradient resistance component is canceled can be set.

Note that, in the present embodiment, at the time when a deceleration is requested from the driver, a gradient correction amount reduction process of reducing the magnitude of the gradient correction torque (a gradient correction amount) to be add to the basic torque target value Tm0* in accordance with the vehicle speed is performed. Details of the gradient correction amount reduction process as a control characteristic to the present invention will be described later.

Figure 3:
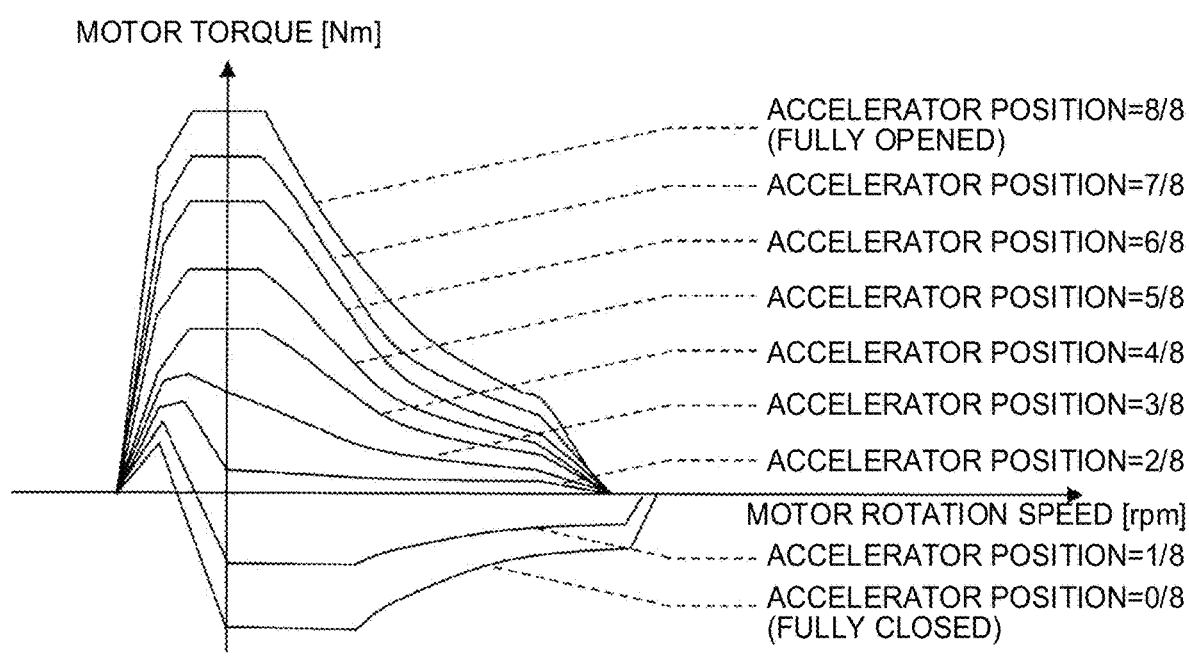
FIG. 3 is a view illustrating one example of an accelerator position-torque table.

Note that, as described above, the control device for the electrically driven vehicle in the present embodiment is applicable to a vehicle that can control acceleration and deceleration or stop of the vehicle only by the operation of the accelerator pedal, and the vehicle can be stopped by at least fully closing of the accelerator pedal. On this account, in the accelerator position-torque table illustrated in FIG. 3, when the accelerator position is from 0 (fully closed) to 1/8, a negative motor torque is set so that a regenerative braking force works. Note that the accelerator position-torque table illustrated in FIG. 3 is one example and is not limited to this.

In step S203, the controller 2 performs a stop control process. More specifically, the controller 2 determines whether the vehicle is just before stop or not. When the vehicle is not just before stop, the controller 2 sets the first torque target value Tm1* calculated in step S202 to a motor torque command value Tm*, and when the vehicle is just before stop, the controller 2 sets a second torque target value Tm2* to the motor torque command value Tm*. The second torque target value Tm2* converges to the disturbance-torque estimated value Td along with a decrease of the motor rotation speed. The second torque target value Tm2* is a positive torque in an uphill road, a negative torque in a downhill road, and generally zero in a flat road.

Further, during the stop control process in which the second torque target value Tm2* is set to the motor torque command value Tm*, the gradient correction amount reduction process (described later) is not performed. That is, during the stop control process, the motor torque command value Tm* converges to the disturbance-torque estimated value Td generally matching the gradient resistance, and therefore, regardless of the gradient of a road surface, the vehicle can smoothly stop only by an accelerator operation and a stop state can be maintained.

Subsequently, in step S204, the controller 2 performs a current command value calculation process. More specifically, a d-axis current target value id* and a q-axis current target value iq* are found based on the motor rotation speed $\omega m$ and the direct-current voltage value $V_{dc}$ in addition to the motor torque command value Tm* calculated in step S203. For example, a table that defines a relationship of a torque command value, a motor rotation speed, and a direct-current voltage value with a d-axis current target value and a q-axis current target value is prepared in advance, and the d-axis current target value id* and the q-axis current target value iq* are found by referring to the table.

In step S205, a current control is performed so that a d-axis current id and a q-axis current iq match the d-axis current target value id* and the q-axis current target value iq* found in step S204, respectively. For this purpose, first, the d-axis current id and the q-axis current iq are found based on the three-phase alternating currents iu, iv, iw and the rotator phase $\alpha$ of the motor 4, input in step S201. Subsequently, d-axis and q-axis voltage command values vd, vq are calculated from deviations between the d-axis and q-axis current target values id*, iq* and the d-axis and q-axis currents id, iq. Note that a non-interference voltage necessary to offset an interference voltage between d-q orthogonal coordinate axes may be added to the d-axis and q-axis voltage command values vd, vq.

Then, three-phase alternating-current voltage command values vu, vv, vw are found from the d-axis and q-axis voltage command values vd, vq and the rotator phase $\alpha$ of the motor 4. PWM signals tu (%), tv (%), tw (%) are found from the three-phase alternating-current voltage command values vu, vv, vw thus found and the direct-current voltage value $V_{dc}$. By opening and closing the switching element of the inverter 3 in response to the PWM signals tu, tv, tw thus found, the motor 4 can be driven by a desired torque instructed by the motor torque command value Tm*.

Details of the process performed in step S202 in FIG. 2, that is, a method for setting the first torque target value Tm1* will be described with reference to FIG. 4.

A basic torque target value setting unit 401 sets the basic torque target value Tm0* by referring to the accelerator position-torque table illustrated in FIG. 3 based on the accelerator position and the motor rotation speed $\omega m$.

A disturbance torque estimator 402 finds the disturbance-torque estimated value Td based on the motor torque command value Tm*, the motor rotation speed $\omega m$, and a brake application amount B.

Figure 5:
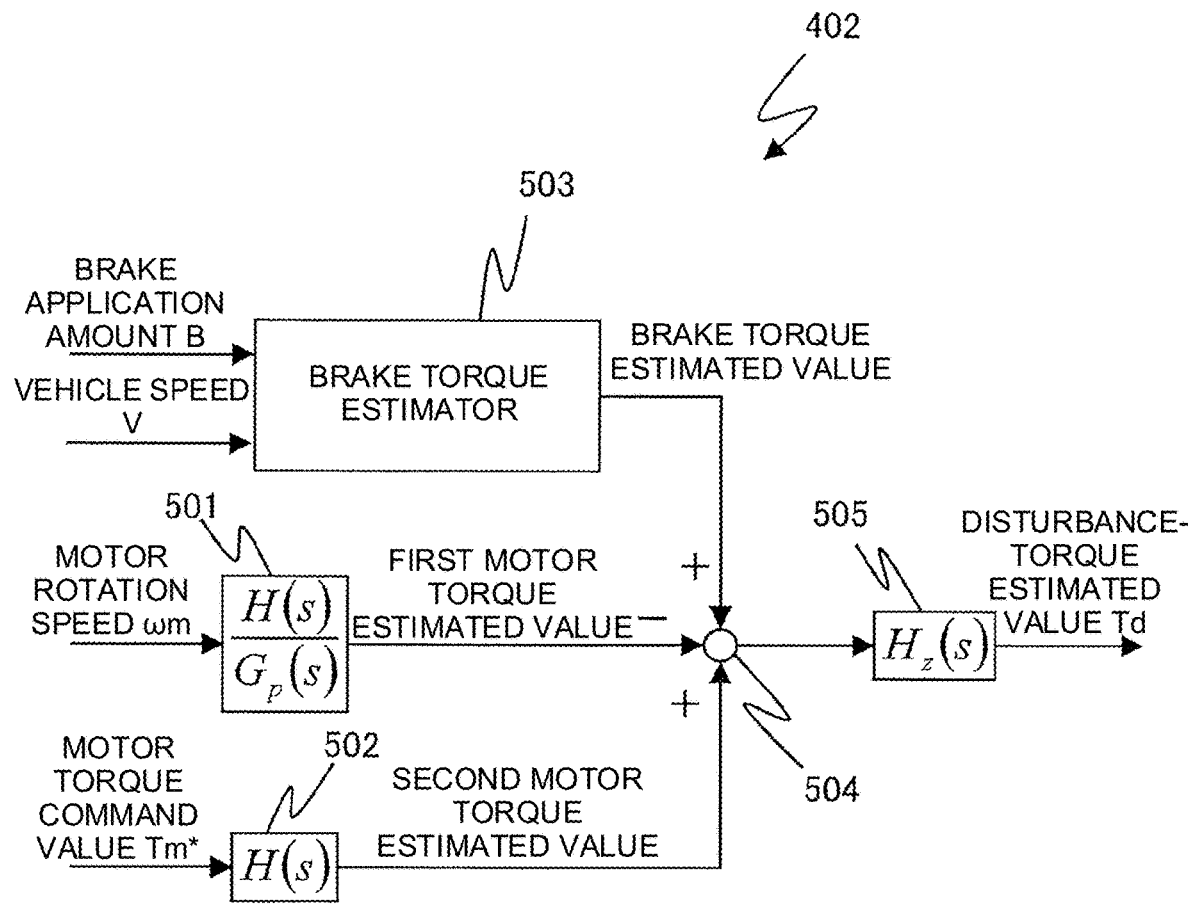
FIG. 5 is a view to describe a method for calculating a disturbance-torque estimated value.

FIG. 5 is a block diagram illustrating a detailed configuration of the disturbance torque estimator 402. The disturbance torque estimator 402 includes a control block 501, a control block 502, a braking torque estimator 503, an adder-subtracter 504, and a control block 505.

The control block 501 functions as a filter having a transfer characteristic indicated by H(s)/Gp(s) and calculates a first motor torque estimated value by receiving the motor rotation speed $\omega m$ and performing filtering. Gp(s) is a transfer characteristic from a motor torque Tm to the motor rotation speed $\omega m$, and details of Gp(s) will be described later. H(s) is a low pass filter having such a transfer characteristic that a difference between a denominator degree and a numerator degree is not less than a difference between a denominator degree and a numerator degree of the transfer characteristic Gp(s).

The control block 502 functions as a low pass filter having a transfer characteristic indicated by H(s) and calculates a second motor torque estimated value by receiving the motor torque command value Tm* and performing filtering.

The braking torque estimator 503 calculates a braking torque estimated value based on the brake application amount B and the vehicle speed V. In the braking torque estimator 503, the braking torque estimated value is calculated in consideration of a multiplication process to perform torque conversion of a motor shaft from the brake application amount B, a responsiveness from a hydraulic sensor value detected by the hydraulic sensor 12 to an actual braking force, and so on.

Note that a braking force caused by the friction brake 13 works in a deceleration direction both at the time of a forward motion of the vehicle and at the time of a backward motion, and therefore, it is necessary to invert a sign of the braking torque estimated value in accordance with a sign of a vehicle longitudinal speed (a speed parameter proportional to the vehicle speed, e.g., a vehicle-body speed, a wheel speed, a motor rotation speed, a drive shaft rotation speed, or the like). Accordingly, when the vehicle moves forward, the braking torque estimator 503 sets the sign of the braking torque estimated value to negative in accordance with the input vehicle speed V, and when the vehicle moves backward, the braking torque estimator 503 sets the sign of the braking torque estimated value to positive in accordance with the input vehicle speed V.

The adder-subtracter 504 subtracts the first motor torque estimated value from the second motor torque estimated value and adds the braking torque estimated value. In the adder-subtracter 504, when a braking torque estimated value having a negative sign is added to a traveling direction of the vehicle, a disturbance-torque estimated value Td in which a braking torque caused due to the brake application amount B is canceled can be calculated in a subsequent stage. The calculated value is output to the control block 505.

Figure 4:
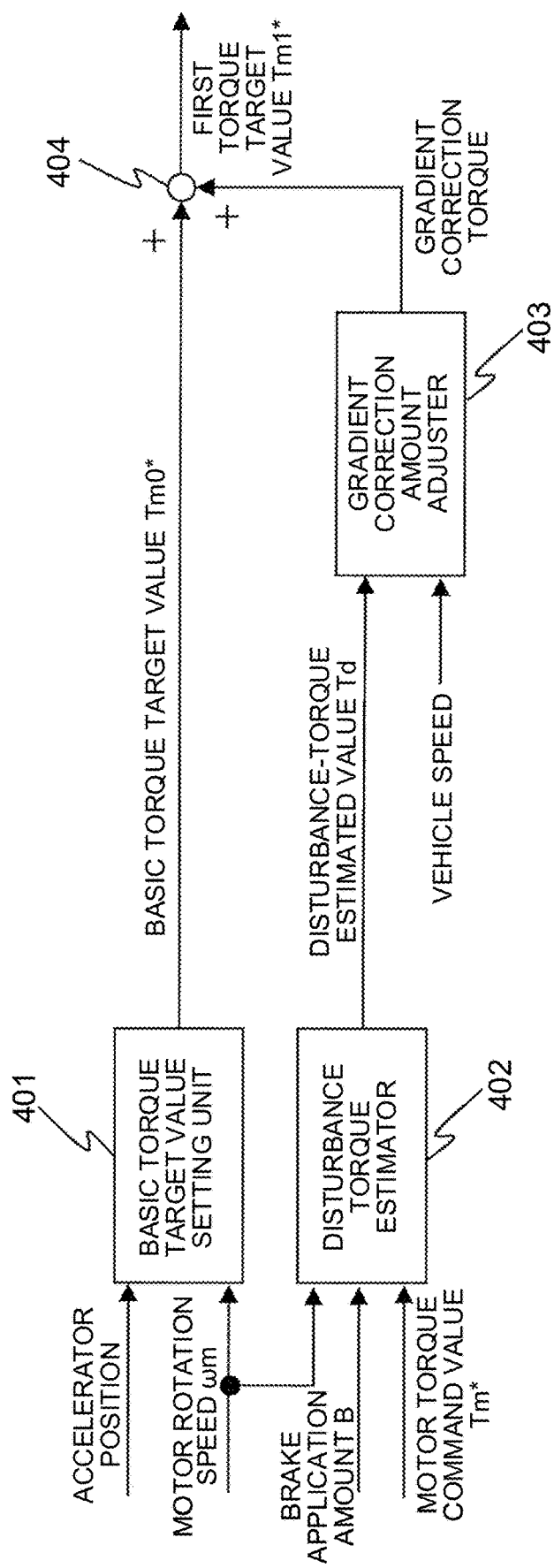
FIG. 4 is a view to describe a method for calculating a first torque target value in one embodiment.

The control block 505 is a filter having a transfer characteristic indicated by Hz(s), and the control block 505 calculates the disturbance-torque estimated value Td by performing filtering on the output from the adder-subtracter 504 and outputs it to a gradient correction amount adjuster 403 illustrated in FIG. 4. Details of Hz(s) will be described later.

Now back to FIG. 4, the following continues the description. The disturbance-torque estimated value Td calculated in the disturbance torque estimator 402 is conventionally input into an adder 404 so as to be added to the basic torque target value Tm0*. Hereby, a gradient correction based on the disturbance-torque estimated value Td is performed on the basic torque target value Tm0* such that the disturbance-torque estimated value Td as a gradient correction torque corresponding to a gradient resistance component is added to the basic torque target value Tm0*, and hereby, the first torque target value Tm1* in which the gradient resistance component is canceled is calculated.

However, when an influence of the gradient resistance component on acceleration and deceleration is completely removed by such a gradient correction, the driver might have an uncomfortable feeling because the driver cannot feel an expected influence of the gradient on acceleration and deceleration. For example, in a case where the accelerator position is less than a predetermined value at the time of traveling on a downhill road (downhill gradient), when a deceleration (a braking force) is corrected incrementally by the gradient correction, a large deceleration might be generated in the vehicle in spite of the downhill gradient. At this time, the driver traveling on the downhill road sensuously expects that the vehicle tends to accelerate due to the gradient and the deceleration is reduced, and therefore, the driver has an uncomfortable feeling in the deceleration that increases against expectation. Further, since the deceleration corrected incrementally becomes relatively larger as the vehicle speed is faster, the uncomfortable feeling to the driver easily becomes larger as the vehicle speed is faster.

In the present embodiment, from the viewpoint of drive feeling, in order to restrain an uncomfortable feeling that can be generated at the time when the deceleration is requested from the driver on the downhill road, the gradient correction amount reduction process of reducing the magnitude (a gradient correction amount) of the gradient correction torque in accordance with the vehicle speed is performed. The following describes a configuration to perform the gradient correction amount reduction process.

The gradient correction amount adjuster 403 illustrated in FIG. 4 is configured to perform the gradient correction amount reduction process, and the gradient correction amount adjuster 403 calculates a gradient correction torque subjected to the gradient correction amount reduction process by receiving the vehicle speed and the disturbance-torque estimated value Td estimated in the disturbance torque estimator 402. More specifically, the gradient correction amount adjuster 403 first calculates a gradient correction amount reduction ratio that is functionally optimized from the viewpoint of drive feeling, from the gradient of a road surface that is detectable from the disturbance-torque estimated value Td and a motor rotation speed as a speed parameter indicative of a vehicle speed. Then, the gradient correction torque is calculated by multiplying the input disturbance-torque estimated value Td by the calculated gradient correction amount reduction ratio. Hereby, the gradient correction torque adjusted to a gradient correction amount that does not give the driver an uncomfortable feeling is calculated. Note that the motor rotation speed used as an index based on which the vehicle speed is detected is one example, and a speed parameter proportional to the vehicle speed, e.g., a wheel speed, a rotation speed of the drive shaft, and the like, is also usable and selected appropriately. Details of a setting method of the gradient correction amount reduction ratio used for calculation of the gradient correction torque will be described later.

The adder 404 adds the basic torque target value Tm0* as a driver request torque calculated in the basic torque target value setting unit 401 to the gradient correction torque calculated by the gradient correction amount adjuster 403, so as to calculate the first torque target value Tm1*.

By use of the first torque target value Tm1* calculated as such, it is possible to reduce the accelerator operation amount (stroke amount) of the driver by the gradient correction amount that does not give an uncomfortable feeling particularly on a downhill road, thereby making it possible to improve the drive feeling at the time of traveling on a gradient road.

Here, prior to the description about the gradient correction amount reduction process, the following describes the transfer characteristic Gp(s) from the motor torque Tm to the motor rotation speed ωm in the control device for the electrically driven vehicle of the present embodiment. At the time of calculating the disturbance-torque estimated value, the transfer characteristic Gp(s) is used as a vehicle model that models a driving force transmission system of the vehicle.

Figure 6:
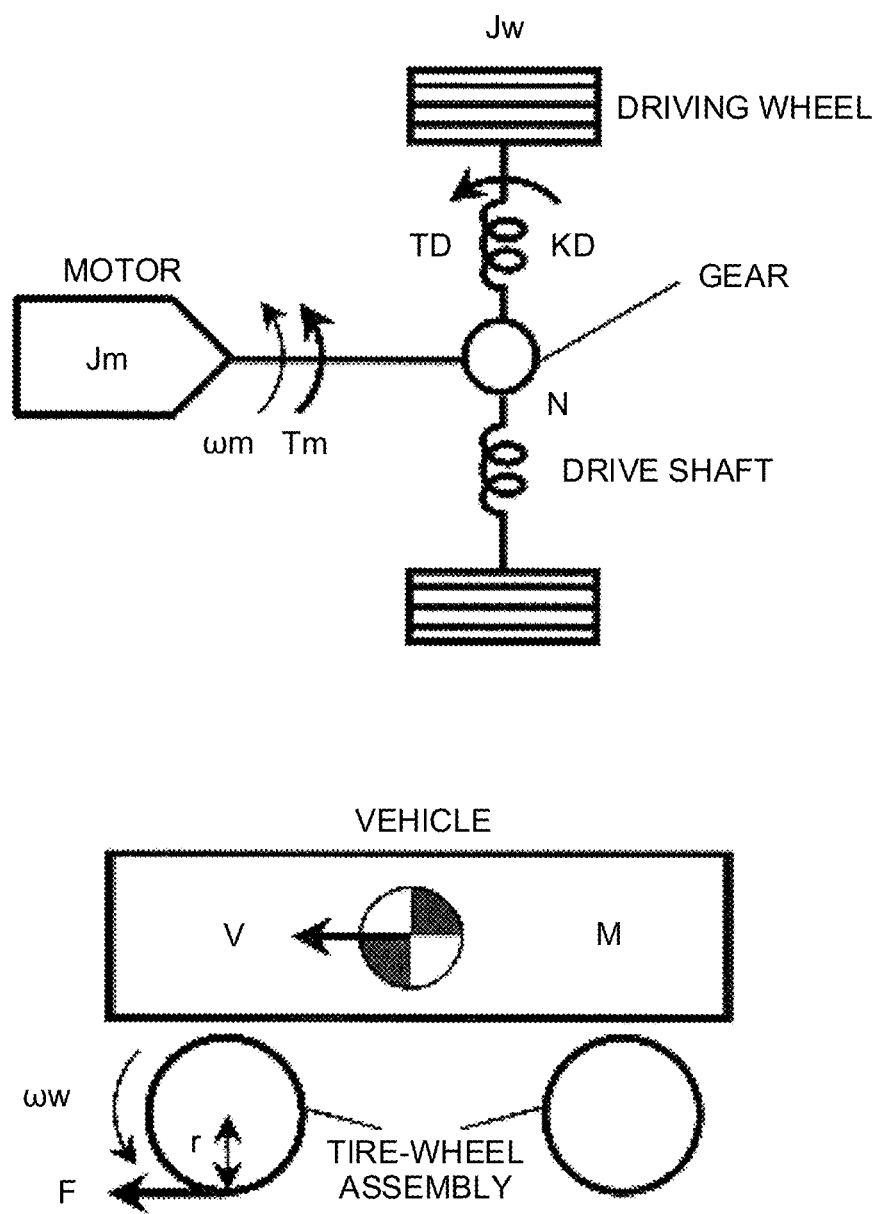
FIG. 6 is a modeled view of a driving force transmission system of the vehicle.

FIG. 6 is a modeled view of the driving force transmission system of the vehicle, and parameters in the figure are as follows.

$J_m$: inertia of electric motor $J_w$: inertia of driving wheel

M: weight of vehicle $K_d$: twist rigidity of driving system $K_t$: coefficient relating to friction between tire and road surface N: overall gear ratio r: load radius of tire ωm: motor rotation speed $T_m$: torque target value Tm*

$T_d$: torque of driving wheel

F: force to be added to vehicle

V: speed of vehicle $ω_w$: angular velocity of driving wheel

From FIG. 6, the following motion equations can be obtained.

[Math. 1]
$$J_m \cdot \omega_m^* = T_m - T_d/N \qquad (1)$$

[Math. 2]
$$2J_w \cdot \omega_w^* = T_d - rF \qquad (2)$$

[Math. 3]
$$M \cdot V^* = F \qquad (3)$$

[Math. 4]
$$T_d = K_d \cdot \int(\omega_m/N - \omega_w)dt \qquad (4)$$

[Math. 5]
$$F = K_t \cdot (r\omega_w - V) \qquad (5)$$

Note that an asterisk (*) attached to the top right corner of a reference sign in Equations (1) to (3) indicates a time derivative.

When the transfer characteristic Gp(s) from the motor torque Tm of the motor 4 to the motor rotation speed com is found based on the motion equations expressed by Equations (1) to (5), Equation (6) is obtained as follows.

[Math. 6]
$$G_p(s) = \frac{b_3 s^3 + b_2 s^2 + b_1 s + b_0}{s(a_4 s^3 + a_3 s^2 + a_2 s + a_1)} \qquad (6)$$

Note that parameters in Equation (6) are expressed by Equation (7).

[Math. 7]
$$a_4 = 2J_m J_w M$$

$$a_3 = J_m (2J_w + Mr^2) K_t$$

$$a_2 = (J_m + 2J_w/N^2) M \cdot K_d$$

$$a_1 = (J_m + 2J_w/N^2 + Mr^2/N^2) K_d \cdot K_t$$

$$b_3 = 2J_w \cdot M$$

$$b_2 = (2J_w + Mr^2) K_t$$

$$b_1 = M \cdot K_d$$

$$b_0 = K_d \cdot K_t \qquad (7)$$

When a pole and a zero-point of the transfer function expressed by Equation (6) are examined, the transfer characteristic Gp(s) can approximate a transfer function expressed by Equation (8) as follows, and one pole and one zero-point exhibit extremely close values. This equivalently indicates that α and β in Equation (8) are extremely close values.

[Math. 8]
$$G_p(s) = \frac{(s+\beta)(b_2' s^2 + b_1' s + b_0')}{s(s+\alpha)(a_3' s^2 + a_2' s + a_1')} \qquad (8)$$

Accordingly, by performing pole-zero cancellation (approximate to α=β) in Equation (8), Gp(s) constitutes a transfer characteristic of (second-order)/(third-order) as expressed in Equation (9).

[Math. 9]
$$G_p(s) = \frac{(b_2' s^2 + b_1' s + b_0')}{s(a_3' s^2 + a_2' s + a_1')} \cdot \frac{\beta}{\alpha} \qquad (9)$$

Subsequently, with reference to FIGS. 7 and 8, details of the stop control process performed in step S203 will be described.

Figure 7:
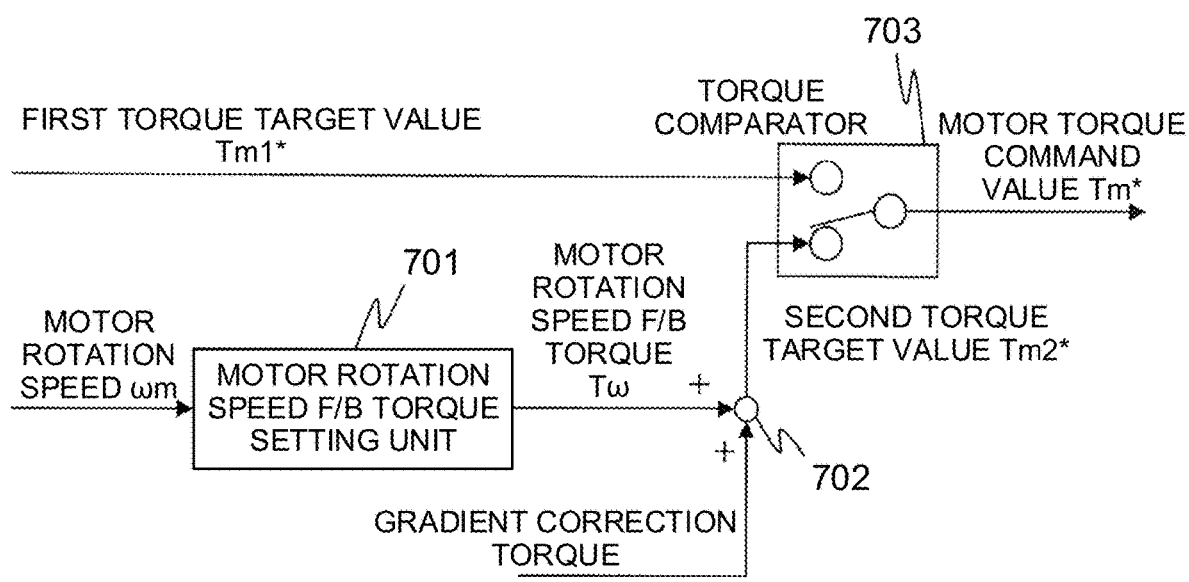
FIG. 7 is a view to describe a stop control process.

FIG. 7 is a block diagram to implement the stop control process. The stop control process is performed by use of a motor rotation speed F/B torque setting unit 701, an adder 702, and a torque comparator 703.

The motor rotation speed F/B torque setting unit 701 calculates a motor rotation speed feedback torque Tω (hereinafter referred to as a motor rotation speed F/B torque Tω) based on the detected motor rotation speed ωm. Details will be described with reference to FIG. 8.

Figure 8:
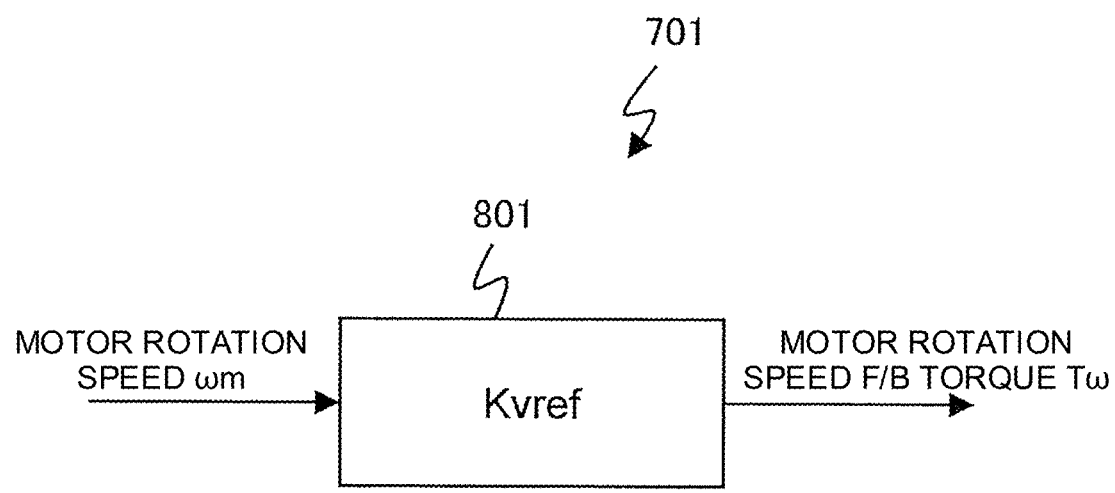
FIG. 8 is a view to describe a method for calculating a motor rotation speed F/B torque $T\omega$ based on a motor rotation speed.

FIG. 8 is a view to describe a method for calculating the motor rotation speed F/B torque Tω based on the motor rotation speed ωm. The motor rotation speed F/B torque setting unit 701 includes a multiplier 801 and calculates the motor rotation speed F/B torque Tω by multiplying the motor rotation speed ωm by a gain Kvref. Note that Kvref is a value of a negative (minus) value necessary to stop the electrically driven vehicle just before stop of the electrically driven vehicle and is set appropriately by experiment data or the like, for example. The motor rotation speed F/B torque Tω is set as a torque that provides a larger braking force as the motor rotation speed ωm is larger.

Note that the above describes that the motor rotation speed F/B torque setting unit 701 calculates the motor rotation speed F/B torque Tω by multiplying the motor rotation speed ωm by the gain Kvref. However, the motor rotation speed F/B torque Tω may be calculated by use of a regenerative torque table that determines a regenerative torque with respect to the motor rotation speed corn, an attenuation factor table in which an attenuation factor of the motor rotation speed corn is stored in advance, or the like.

Now back to FIG. 7, the following continues the description. The adder 702 adds, to the motor rotation speed F/B torque Tw calculated by the motor rotation speed F/B torque setting unit 701, the gradient correction torque calculated in the gradient correction amount adjuster 403 by multiplying the disturbance-torque estimated value Td by a gradient correction amount reduction ratio, so as to calculate the second torque target value Tm2*.

Here, in terms of the disturbance-torque estimated value Td, details of the control block 505 illustrated in FIG. 5 will be described. The control block 505 is a filter having a transfer characteristic indicated by Hz(s), and the control block 505 receives an output from the adder-subtracter 504 and performs filtering so as to calculate the disturbance-torque estimated value Td.

The following describes the transfer characteristic Hz(s). When Equation (9) is rewritten, Equation (10) is provided as follows. Note that $\zeta z$, $\omega z$, $\zeta p$, $\omega p$ in Equation (10) are expressed as Equation (11).

[Math. 10]

$$G_p(s) = \frac{Mp(s^2 + 2\zeta_z \cdot \omega_z \cdot s + \omega_z^2)}{s(s^2 + 2\zeta_p \cdot \omega_p \cdot s + \omega_p^2)} \quad (10)$$

[Math. 11]

$$\zeta_z = \frac{b'_1}{2(b'_0 \cdot b'_2)^{1/2}} \quad (11)$$

$$\omega_z = \left(\frac{b'_0}{b'_2}\right)^{1/2}$$

$$\zeta_p = \frac{a'_2}{2(a'_1 \cdot a'_3)^{1/2}}$$

$$\omega_p = \left(\frac{a'_1}{a'_3}\right)^{1/2}$$

From above, Hz(s) is expressed by Equation (12) as follows. Note that $\zeta_c > \zeta_z$ is established. Further, in order to raise a vibration restraint effect in a deceleration scene that causes backlash of a gear, for example, $\zeta_c > 1$ is established.

[Math. 12]

$$H_z(s) = \frac{(s^2 + 2\zeta_z \cdot \omega_z \cdot s + \omega_z^2)}{(s^2 + 2\zeta_c \cdot \omega_z \cdot s + \omega_z^2)} \quad (12)$$

As such, as illustrated in FIG. 5, the disturbance-torque estimated value Td in the present embodiment is estimated from a disturbance observer. Note that the disturbance-torque estimated value Td may be corrected based on a detection value detected by the longitudinal G sensor 15 so as to further raise the accuracy. Further, a torque converted value of the gradient resistance component, calculated based on the detection value detected by the longitudinal G sensor 15, may be used as the disturbance-torque estimated value Td.

Here, as a disturbance, an air resistance, a modeling error due to a fluctuation in vehicle mass caused by the number of occupants or a load capacity, a rolling resistance of a tire, a gradient resistance of a road surface, and the like are considered, but a disturbance factor that is dominant particularly at the time when the vehicle is just before stop is the gradient resistance. The disturbance factor varies depending on operating conditions, but since the disturbance torque estimator 402 calculates the disturbance-torque estimated value Td based on the motor torque command value Tm*, the motor rotation speed com, and the transfer characteristic Gp(s), the disturbance factors described above can be estimated collectively. Hereby, under any operating condition, it is possible to achieve a smooth stop from deceleration.

Now back to FIG. 7, the following continues the description. The adder 702 adds the motor rotation speed F/B torque Tω calculated by the motor rotation speed F/B torque setting unit 701 and the gradient correction torque so as to calculate the second torque target value Tm2*.

The torque comparator 703 compares respective magnitudes of the first torque target value Tm1* and the second torque target value Tm2* with each other and sets a torque target value with a larger value to the motor torque command value Tm*. During traveling of the vehicle, the second torque target value Tm2* is smaller than the first torque target value Tm1*, and when the vehicle decelerates and becomes just before stop, the second torque target value Tm2 becomes larger than the first torque target value Tm1*. Accordingly, when the first torque target value Tm1* is larger than the second torque target value Tm2*, the torque comparator 703 determines that the vehicle does not become just before stop, and sets the first torque target value Tm1* to the motor torque command value Tm*. Note that, when the vehicle speed becomes not larger than a default value (a stop-control-start vehicle speed) that determines, in advance, a rotation speed of the motor or a speed parameter proportional to the rotation speed of the motor based on which it can be determined that the vehicle is just before stop, it may be determined that the vehicle is just before stop.

Further, when the second torque target value Tm2* becomes larger than the first torque target value Tm1", the torque comparator 703 determines that the vehicle is just before stop, and the torque comparator 703 changes the motor torque command value Tm* from the first torque target value Tm1" to the second torque target value Tm2*. At this time, the gradient correction torque is set to a value that matches the disturbance-torque estimated value Td. Accordingly, while the second torque target value Tm2* is set to the motor torque command value Tm*, a deceleration control process (described later) is not performed or the gradient correction amount reduction ratio is set to 0%. Note that in order to maintain a vehicle stop state, the second torque target value Tm2* converges to a positive torque in an uphill road, to a negative torque in a downhill road, and to generally zero in a flat road.

The details of the transfer characteristic $G_p(s)$ and the stop control process have been described above. Subsequently, the following describes details of calculation of the gradient correction amount reduction ratio and calculation of the gradient correction torque based on the gradient correction amount reduction ratio to be performed in the gradient correction amount adjuster 403 illustrated in FIG. 4.

<Gradient Correction Amount Reduction Process>

Figure 9:
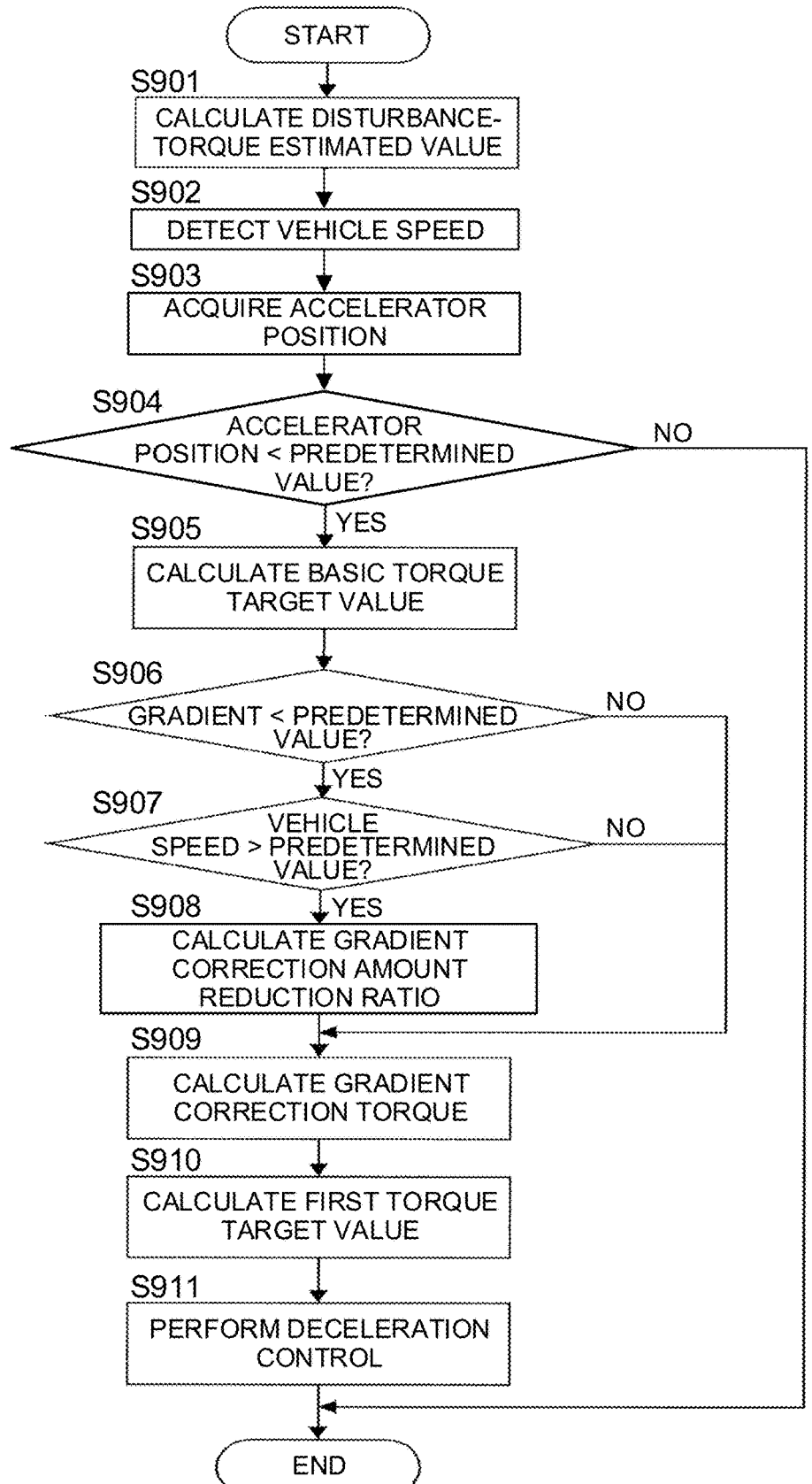
FIG. 9 is a flowchart illustrating the procedure of a deceleration control process.

FIG. 9 is a flowchart illustrating the procedure of the gradient correction amount reduction process in the present embodiment. The gradient correction amount reduction process is programmed to be performed repeatedly at a given cycle in the motor controller 2.

In step S901, the motor controller 2 calculates the disturbance-torque estimated value Td. The disturbance-torque estimated value Td is calculated by use of the disturbance observer described with reference to FIG. 5.

In subsequent step S902, the motor controller 2 acquires the vehicle speed V. The vehicle speed V is acquired from a detection value of the motor rotation speed, the wheel speed, or the speed parameter proportional to them. After the vehicle speed V is acquired, a process of subsequent step S903 is executed.

In step S903, the motor controller 2 acquires the accelerator position as the accelerator operation amount of the driver so as to detect a deceleration request from the driver. When the accelerator position is acquired, a process of subsequent step S904 is executed.

In step S904, the motor controller 2 determines whether the driver requests deceleration or not, based on the accelerator position thus acquired. As described with reference to FIG. 3, an accelerator position having a predetermined value or more is an acceleration request, so that a positive motor torque (a driving torque) is set. In the meantime, an accelerator position less than the predetermined value is a deceleration request, and a negative motor torque (a braking torque) is set so that a regenerative braking force works. Accordingly, when the accelerator position is less than the predetermined value, it can be determined that the driver requests deceleration. Note that the predetermined value used herein is a lower limit value of the accelerator position at which the driving torque is set. In a case where it is determined that the driver requests deceleration, in order to calculate the basic torque target value Tm0* as a braking torque requested by the driver, a process of subsequent step S905 is performed.

In the meantime, when the acquired accelerator position is the predetermined value or more, that is, the accelerator position is an accelerator position at which the driving torque is set, it is determined that the driver requests acceleration, so that the gradient correction amount reduction process in this procedure is finished.

In step S905, the motor controller 2 refers to the accelerator position-torque table one example of which is illustrated in FIG. 3 and calculates the basic torque target value Tm0* as a driver request torque from the accelerator position θ and the motor rotation speed ωm. When the basic torque target value Tm0* is calculated, a process of subsequent step S906 is performed so as to determine whether a road surface where the vehicle travels is a downhill road or not.

In step S906, the motor controller 2 determines whether or not the gradient (%) of the road surface is less than a predetermined value. Herein, since it is to be determined whether the road surface is a downhill road or not, the predetermined value is set to 0%. Note that, as described above, the gradient of the road surface can be acquired from the disturbance-torque estimated value Td. Here, the disturbance-torque estimated value Td is a positive torque in an uphill road, a negative torque in a downhill road, and generally zero in a flat road. Accordingly, in this step, when the disturbance-torque estimated value Td is less than zero, it is determined that the road surface is a downhill road, so that a process of subsequent step S907 is performed. When the disturbance-torque estimated value Td is zero or more, it is determined that the road surface is not a downhill road, so that a process of step S909 is performed without performing the gradient correction amount reduction process.

In step S907, the motor controller 2 determines whether or not the vehicle speed is larger than a predetermined vehicle speed. This step is a process to detect a timing before the vehicle stops during deceleration of the vehicle. Accordingly, as the predetermined vehicle speed used herein, a vehicle speed that is not less than a vehicle speed (e.g., 2 to 3 km/h) based on which it can be determined that the vehicle is just before stop is set. Further, in order to prohibit a reduction of the gradient correction amount earlier than a time point just before stop of the vehicle with a margin of time, the predetermined vehicle speed may be set to around 10 km/h, for example. Note that the predetermined vehicle speed used herein in the present embodiment shall be set to 3 km/h.

Note that the predetermined vehicle speed to be compared herein is a vehicle speed that is not less than at least a vehicle speed (stop-control-start vehicle speed) at which the stop control process is performed. As described above, when the stop control on the vehicle is started, the second torque target value Tm2* is set to the motor torque command value. The second torque target value Tm2* converges to the disturbance-torque estimated value Td as the gradient correction torque along with a decrease of the motor rotation speed, and the second torque target value Tm2* is a positive torque in an uphill road, a negative torque in a downhill road, and generally zero in a flat road. Hereby, the vehicle can smoothly stop even in a gradient road, and a vehicle stop state can be maintained. That is, after the stop control is started, the motor torque command value is matched with a gradient disturbance, so that the vehicle stops. Accordingly, when the gradient correction is performed after the stop control process is started, the motor torque command value does not match the gradient disturbance, so that the vehicle cannot stop. Accordingly, before the vehicle stops and at least in a region of the predetermined vehicle speed or less at which the stop control to cause the motor torque to converge to the disturbance-torque estimated value Td is performed, the gradient correction amount reduction process is not performed. Hereby, in the scene where the vehicle stops, the gradient correction torque matches the disturbance-torque estimated value Td, so that the vehicle can smoothly stop by the stop control in a gradient road, and the vehicle stop state can be maintained. Note that, in a case where the stop control process is not performed, the predetermined vehicle speed to be compared in step S907 should be a value of at least 0 km/h or more.

Subsequently, in step S908, the motor controller 2 determines a ratio (the gradient correction amount reduction ratio) to reduce the gradient correction amount, in accordance with the vehicle speed. The gradient correction amount reduction ratio is calculated in accordance with the vehicle speed acquired in step S902 based on a relationship between an absolute value of the vehicle speed [km/h] (hereinafter referred to as an absolute value vehicle speed or just a vehicle speed) exemplified in FIG. 10 or 11 and the gradient correction amount reduction ratio [%], for example. Note that this step is a process to be performed in the gradient correction amount adjuster 403 illustrated in FIG. 4.

Figure 10:
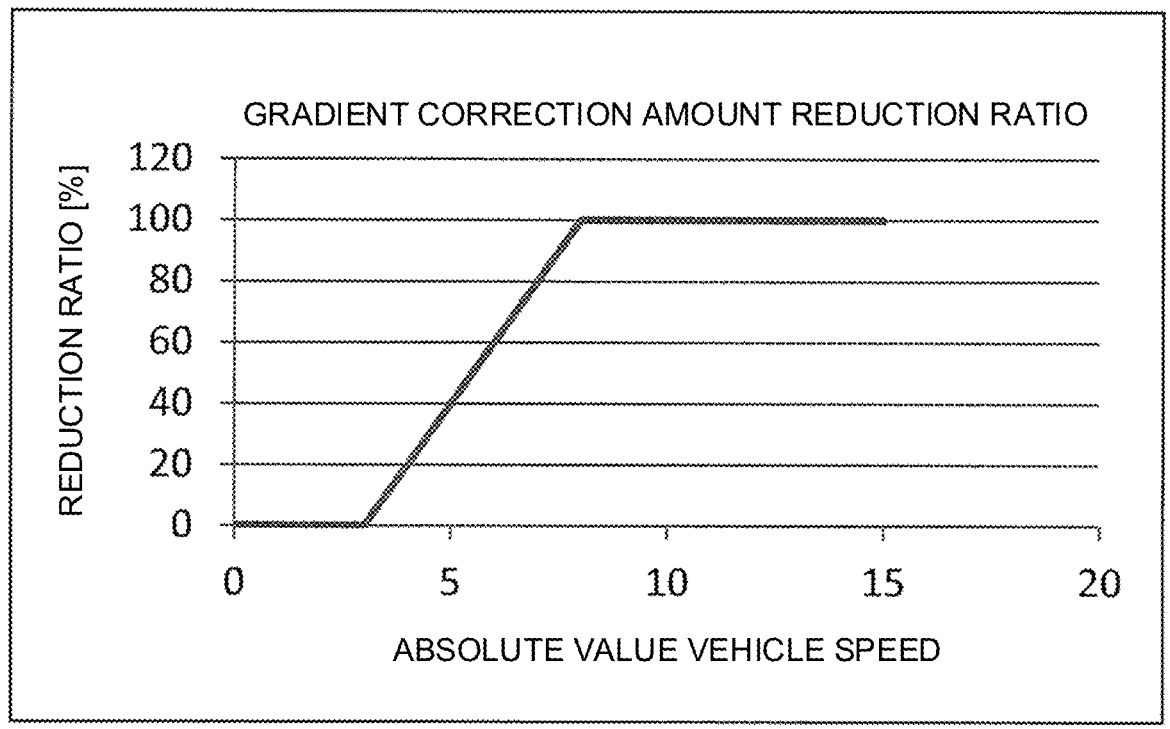
FIG. 10 is a view illustrating one example of a gradient correction amount reduction ratio to an absolute value vehicle speed in one embodiment.
Figure 11:
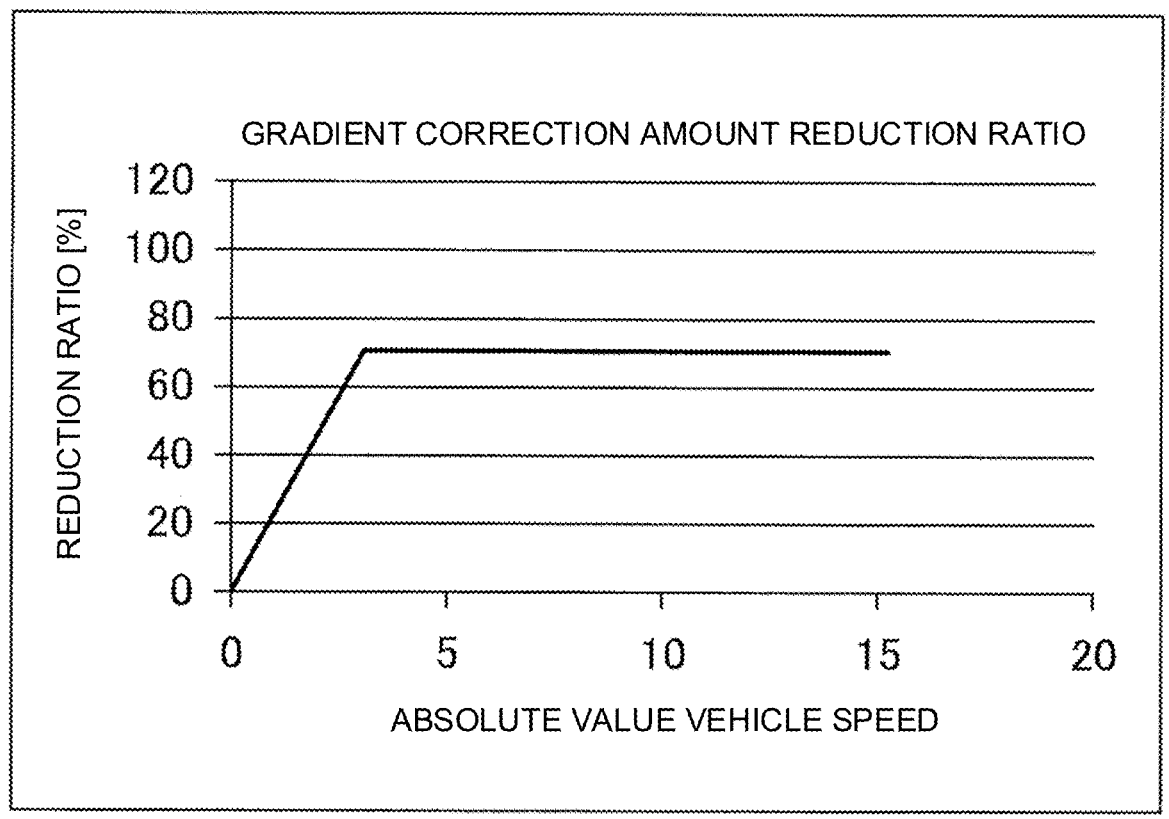
FIG. 11 is a view illustrating one example of the gradient correction amount reduction ratio to the absolute value vehicle speed in one embodiment.

FIGS. 10 and 11 are views each illustrating one example of the relationship between the vehicle speed [km/h] and the gradient correction amount reduction ratio [%]. The horizontal axis indicates the absolute value of the vehicle speed (km/h), and the vertical axis indicates the gradient correction amount reduction ratio (%). The gradient correction amount reduction ratio indicates a ratio to reduce a gradient correction amount when the gradient correction amount (gradient correction torque) at the time when the disturbance-torque estimated value Td generally matching the gradient resistance is canceled from the basic torque target value Tm0* is assumed 1 (100%). Accordingly, when the gradient correction amount reduction ratio is 0%, the gradient correction amount is 1, and the disturbance-torque estimated value Td is set as the gradient correction torque without any change. When the gradient correction amount reduction ratio is 100%, the gradient correction amount is zero (0%), and the gradient correction torque is set to 0. Note that, in this procedure, the gradient correction amount reduction ratio illustrated in FIG. 10 shall be employed.

The gradient correction amount reduction ratio illustrated in FIG. 10 is set to 100% in a region where the absolute value of the vehicle speed in a downhill road is about 8 km/h or more. In accordance with a decrease of the vehicle speed from 8 km/h to about 3 km/h, the gradient correction amount reduction ratio also becomes smaller as the vehicle speed becomes smaller. When the vehicle speed becomes less than 3 km/h, the reduction ratio is 0%, so that the gradient correction amount is not reduced. As illustrated in the figure, the gradient correction amount reduction ratio is set to 40% when the vehicle speed is 5 km/h, so that the gradient correction amount is 0.6 (60%). Accordingly, a value obtained by multiplying the disturbance-torque estimated value Td by 0.6 (60%) is set as the gradient correction torque. As such, after the gradient correction amount reduction ratio corresponding to the vehicle speed is determined, a process of subsequent step S909 is performed.

Note that FIG. 11 is a view illustrating one example of the gradient correction amount reduction ratio conceivable other than FIG. 10. The gradient correction amount reduction ratio illustrated in FIG. 11 is set to 70% in a region where the absolute value of the vehicle speed in a downhill road is about 3 km/h or more. In accordance with a decrease of the vehicle speed from 3 km/h to 0 km/h, the gradient correction amount reduction ratio also becomes smaller as the vehicle speed becomes smaller, and when the vehicle speed reaches 0 km/h, the gradient correction amount reduction ratio reaches 0%. Note that, in a case where the gradient correction amount reduction ratio illustrated in FIG. 11 is employed in this procedure, a predetermined value to be compared with the vehicle speed in step S907 is set to 0 km/h.

Here, common points in FIGS. 10 and 11 about the transition of the gradient correction amount reduction ratio are that the gradient correction amount reduction ratio is 0% at least when the vehicle speed is 0 km/h and that the gradient correction amount reduction ratio is set to a smaller value as the vehicle speed is smaller. In other words, on the premise that the transition of the gradient correction amount reduction ratio is 0% when the vehicle speed is 0 km/h and the gradient correction amount reduction ratio is set to a smaller value as the vehicle speed is smaller, the transition of the gradient correction amount reduction ratio is not limited to those illustrated in FIGS. 10, 11 and may be functionally optimized by experiment or the like from the viewpoint of drive feeling.

Further, the gradient correction amount reduction ratio may be further adjusted in accordance with a difference between a present motor torque and the gradient correction torque. For example, in a case where the present motor torque approaches the gradient correction torque, it can be determined that the vehicle is about to stop, so the gradient correction amount reduction ratio may be further adjusted to be decreased.

In step S909, the motor controller 2 calculates the gradient correction torque. More specifically, the gradient correction torque is calculated by multiplying the disturbance-torque estimated value Td calculated in step S901 by the gradient correction amount reduction ratio calculated in the previous step. As has been described about the gradient correction torque with reference to FIG. 10, in a speed region of 8 km/h or more, the gradient correction amount reduction ratio is 100 [%], and therefore, the gradient correction torque is 0. As the vehicle speed decreases from 8 km/h to 3 km/h, the gradient correction amount reduction ratio becomes smaller, and therefore, the gradient correction torque approaches the disturbance-torque estimated value Td as the vehicle speed becomes smaller. In a low speed range lower than a vehicle speed of 3 km/h, the gradient correction amount reduction ratio is 0%, so that the gradient correction torque matches the disturbance-torque estimated value Td.

Note that, in a case where the process of step S909 is performed after a NO-determination is made in step S906 or S907, when the gradient correction amount reduction ratio is set to 100%, the gradient correction torque matching the disturbance-torque estimated value Td is calculated.

In step S910, the motor controller 2 calculates the first torque target value Tm1*. More specifically, as illustrated in FIG. 4, the first torque target value Tm1* is calculated by adding the basic torque target value Tm0* as a driver request torque to the gradient correction torque calculated in step S908. At the time of normal traveling that is not just before stop of the vehicle, the first torque target value Tm1* is set to the motor torque command value Tm* (see FIG. 7).

In step S911, the motor controller 2 controls the motor 4 by the first torque target value Tm1* set as the motor torque command value Tm*, so as to perform a braking control on the vehicle based on a deceleration request from the driver.

Effects obtained when the control device for the electrically driven vehicle in one embodiment as described above is applied to an electric vehicle will be described with reference to FIG. 12.

Figure 12:
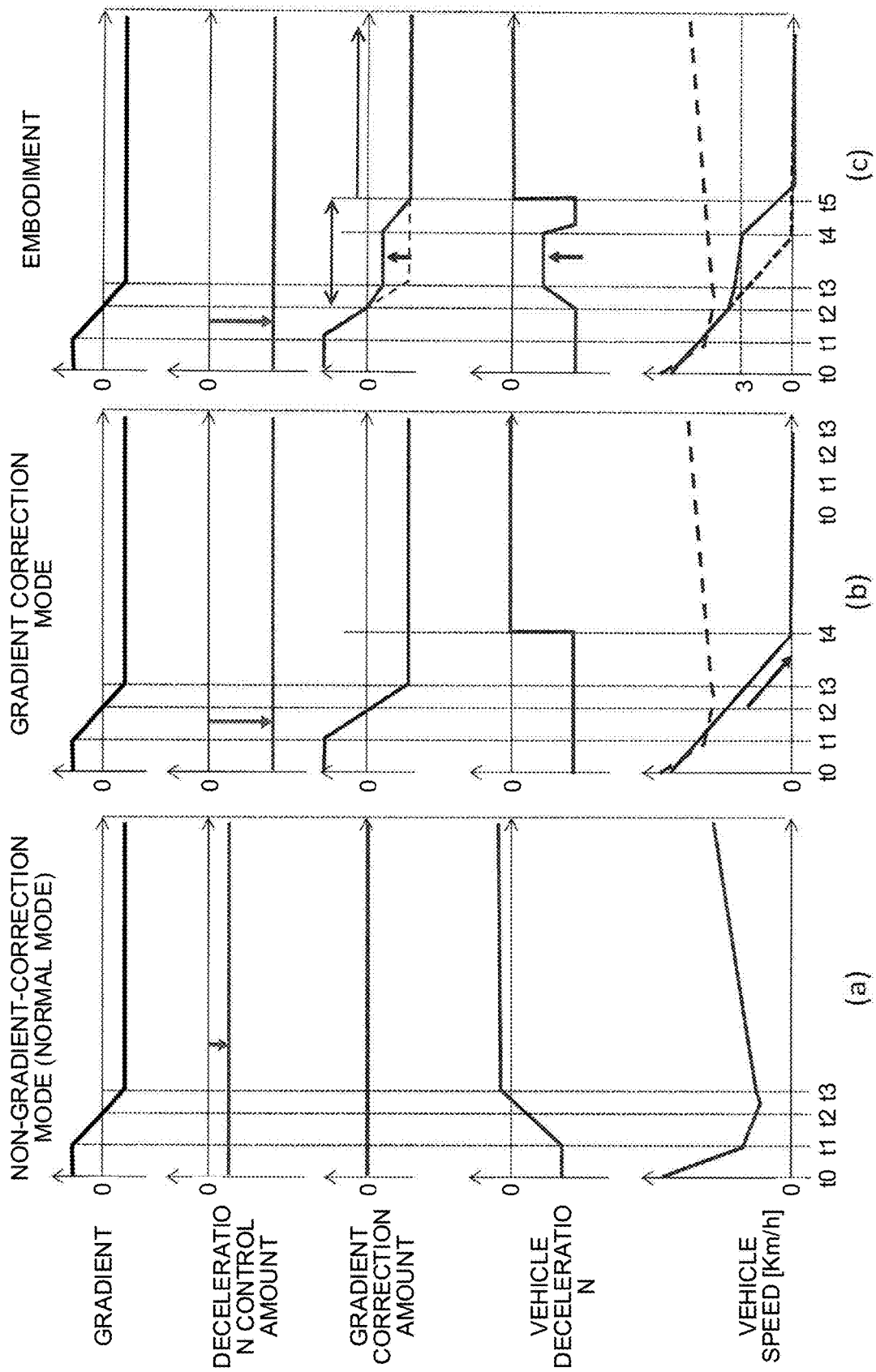
FIG. 12 is a view illustrating one example of a control result by the control device for the electrically driven vehicle in one embodiment.

FIG. 12 is a view to compare one example (c) of a control result obtained by the control device for the electrically driven vehicle in the present embodiment with control results (a) and (b) in the conventional technique. The control result (a) indicates a non-gradient-correction mode (normal mode), and the control result (b) indicates a gradient correction mode.

What is illustrated in FIG. 12 is control results obtained in the scene where the vehicle decelerates and then stops on a road surface where the gradient changes, and a gradient, a deceleration-controlled amount, a gradient correction amount, a vehicle deceleration, and a vehicle speed are illustrated sequentially from the top. Note that, in the control in this time chart, the stop control process shall not be performed. Accordingly, in the control in this time chart, the first torque target value Tm1* is always set to the motor torque command value Tm* while the vehicle stops from normal traveling of the vehicle.

In terms of the gradient illustrated in the figure, a positive value indicates an uphill road, and a negative value indicates a downhill road. A larger absolute value indicates a steeper gradient. The deceleration-controlled amount is a deceleration given to the vehicle by the driver via the accelerator operation and corresponds to the basic torque target value Tm0* at the time of deceleration by an accelerator position less than the predetermined value. The gradient correction amount corresponds to the gradient correction torque illustrated in FIG. 4. The vehicle deceleration indicates an actual deceleration during the deceleration control. The vehicle speed indicates an actual vehicle speed during the deceleration control.

<Non-gradient-correction Mode (Normal Mode)>

First described is a conventional control (the non-gradient-correction mode (a)) illustrated in the left end in the figure. From time t1 to time t3, a road surface gradient changes from an uphill road to a downhill road. During this period, a deceleration requested by the driver is uniform as illustrated herein. Note that, in this mode, the driver does not have an intention to stop the vehicle, and the vehicle shall not stop in the downhill road only by the deceleration requested by the driver.

In the non-gradient-correction mode, the gradient correction is not performed. Accordingly, the vehicle deceleration is affected by the gradient resistance, so that the vehicle deceleration from before time t1 to after time t2 decreases (approaches zero) relative to a uniform deceleration-controlled amount as the gradient of the uphill road becomes moderate. Subsequently, after time t2, the road surface gradient shifts to a downhill road, so that the deceleration of the vehicle further decreases. Then, after time t2.5, the vehicle cannot decelerate by the deceleration requested by the driver, so that the vehicle shifts to an acceleration side. That is, in a case where the gradient correction is not performed, when the deceleration-controlled amount does not satisfy a braking force that can stop the vehicle in a downhill road, the vehicle may accelerate against the deceleration request from the driver. At this time, in a case where the driver wants to decelerate or stop the vehicle, the driver further reduces the accelerator position or steps on the brake pedal.

<Gradient Correction Mode>

Next will be described a conventional control (the gradient correction mode (b)) illustrated in the center of the figure. Though a deceleration requested by the driver is uniform as illustrated herein, the driver has an intention to stop the vehicle in this mode. Further, a broken line shown in the vehicle speed indicates a vehicle speed by the control in the normal mode (a).

In the gradient correction mode, the gradient correction is performed, but a reduction process of the gradient correction amount is not performed. That is, the gradient correction amount (the gradient correction torque) in this mode always matches a gradient disturbance (the disturbance-torque estimated value Td). Accordingly, from time t0 to after t4, the gradient correction amount increases and decreases so as to correspond to the change of the road surface gradient.

In view of this, the vehicle deceleration in the gradient correction mode is corrected to increase in accordance with the gradient (the absolute value increases) in an uphill road, while the vehicle deceleration in the gradient correction mode is corrected to decrease in accordance with the gradient (the absolute value decreases) in a downhill road. Accordingly, although the deceleration requested by the driver is uniform, the deceleration caused in the vehicle is always uniform without being affected by the change of the gradient until the vehicle stops at t4. As a result, even in the scene where the accelerator operation amount of the driver is uniform, when the road surface gradient changes from an uphill road to a downhill road, the vehicle speed might greatly decrease due to the gradient correction.

At this time, generally, the driver expecting that the vehicle tends to accelerate in the downhill road has an uncomfortable feeling for the control in that the vehicle greatly decelerates against expectation.

Control in Present Embodiment

Next will be described the control result (c) by the control device for the electrically driven vehicle in the present embodiment. In this control result, a deceleration requested by the driver is uniform similarly to the non-gradient-correction mode, and the driver has an intention to stop the vehicle. Further, a broken line shown in the vehicle speed indicates a vehicle speed by the control in the normal mode (a). A dotted line shown in the gradient correction amount and in the vehicle speed indicates a vehicle speed by the control in the gradient correction mode (b) in which the gradient resistance is corrected 100%. Note that, in the control to be described by use of this time chart, the gradient correction amount reduction process shall be performed by the gradient correction amount reduction ratio illustrated in FIG. 11.

From time t0 to time t2, the road surface is not a downhill road, and therefore, the gradient correction in which the gradient resistance is corrected 100% is performed in the present embodiment. Accordingly, the control until time t2 is similar to the gradient correction mode (b).

Here, in the control in the present embodiment, in a case where the deceleration control in the downhill road is being performed and the vehicle speed is larger than 0 km/h (see FIG. 11), the gradient correction amount reduction process of reducing the gradient correction amount is performed. The gradient correction amount reduction ratio in this process is uniformly set to 70% when the vehicle speed is larger than 3 km/h, as described with reference to FIG. 11. As the vehicle speed approaches 0 km/h from 3 km/h, the gradient correction amount reduction ratio also becomes smaller, and when the vehicle speed reaches 0 km/h, the gradient correction amount reduction ratio reaches 0%.

After time t2, the deceleration control in the downhill road is being performed, so that the gradient correction amount reduction process is performed. Accordingly, from t2 to after t4, the vehicle speed is larger than 3 km/h, so that the gradient correction amount is reduced by 70%. As a result, the vehicle deceleration decreases, so that the vehicle speed is decreased more moderately than the control in the gradient correction mode (b) in which the gradient resistance is corrected 100%.

After that, the vehicle speed becomes 3 km/h or less at time t4. When the vehicle speed is 3 km/h or less, the gradient correction amount reduction ratio in this control decreases from 70% as the vehicle speed decreases to 0 km/h, and when the vehicle speed reaches 0 km/h, the gradient correction amount reduction ratio reaches 0%. Accordingly, the gradient correction amount increases as the vehicle speed decreases, and when the vehicle speed reaches zero, the gradient correction amount matches the disturbance-torque estimated value (the dotted line). That is, in this control, the deceleration of the vehicle from time t2 to t5 is made more moderate than the deceleration of the vehicle in the gradient correction mode (b), and at a time point when the vehicle stops, the gradient correction amount is matched with the gradient resistance similarly to the gradient correction mode (b).

Hereby, while the uncomfortable feeling given to the driver when the gradient correction is performed 100% in the scene where the vehicle is to stop is reduced, the gradient correction amount is matched with the gradient resistance at the time point when the vehicle speed is 0 km/h, thereby making it possible to surely stop the vehicle by the gradient correction.

As described above, the control device for the electrically driven vehicle according to one embodiment is a device including the motor 4 configured to supply the vehicle with a braking force or a driving force corresponding to an accelerator operation amount, and is a device that implements the control method for the electrically driven vehicle in such a manner that, when the accelerator operation amount is less than a predetermined value, the braking force is controlled, and when the accelerator operation amount is the predetermined value or more, the driving force is controlled. The device calculates a torque target value (the basic torque target value Tm0*) at which the motor 4 is caused to output a braking/driving torque corresponding to the accelerator operation amount, estimates a disturbance torque acting on the motor 4 as a resistance corresponding to a road surface gradient, performs a correction to remove the disturbance torque from the torque target value, and controls the motor 4 in accordance with the corrected torque target value (the motor torque command value Tm*). Then, in a downhill road, when the accelerator operation amount is less than the predetermined value and the vehicle speed is larger than a predetermined vehicle speed, a correction amount (the gradient correction amount) in the correction is reduced.

Hereby, since the gradient correction amount in the downhill road is reduced in accordance with the vehicle speed, it is possible to reduce a gap between the deceleration of the vehicle in the downhill road and the deceleration corresponding to the accelerator operation amount of the driver, thereby making it possible to restrain an uncomfortable feeling to be given to the driver in the downhill road.

Further, the control device for the electrically driven vehicle according to one embodiment reduces the gradient correction amount in the downhill road when the accelerator operation amount is less than the predetermined value and the absolute value of the vehicle speed is larger than zero. Hereby, at least when the vehicle speed is zero, that is, at least at a timing when the vehicle stops, the gradient correction amount is not reduced, thereby making it possible to surely stop the vehicle by the gradient correction torque in a gradient road.

Further, in the control device for the electrically driven vehicle in one embodiment, in the downhill road, when the accelerator operation amount is less than the predetermined value and the vehicle speed is larger than the predetermined vehicle speed, a ratio (the gradient correction amount reduction ratio) to reduce the gradient correction amount is decreased as the vehicle speed decreases. Hereby, while the gradient correction amount is decreased so that the vehicle is to stop, it is possible to effectively restrain an uncomfortable feeling in the control that becomes relatively larger as the vehicle speed is larger.

Further, the control device for the electrically driven vehicle according to one embodiment detects a rotation speed of the motor 4 or a speed parameter proportional to the rotation speed, and when the vehicle speed becomes the stop-control-start vehicle speed or less, the control device controls the motor 4 without reducing the gradient correction amount so that a motor torque converges to a disturbance torque along with the decrease of the rotation speed of the motor 4 or the speed parameter. Further, the stop-control-start vehicle speed is a vehicle speed at which the vehicle is just before stop and the rotation speed of the motor 4 or the speed parameter is smaller than a default value determined in advance. Hereby, while an uncomfortable feeling to be given to the driver in a downhill road is restrained, it is possible to smoothly stop the vehicle after the vehicle has become just before stop in a gradient road and to maintain a vehicle stop state.

As such, the control device for the electrically driven vehicle according to one embodiment of the present invention has been described, but the embodiment has just provided a part of the present invention and is not intended to limit the technical scope of the present invention to the concrete configurations of the embodiment. For example, in the above description, in a case where the accelerator position is less than the predetermined value as described with reference to FIG. 3, it is determined that the driver has an intention to decelerate the vehicle (see step S904 in FIG. 9). However, it may be determined that the driver has an intention to decelerate the vehicle when the accelerator position is smaller than a partial equivalent amount. Note that the partial equivalent amount as used herein indicates an accelerator position that achieves a state where the vehicle travels so as to keep a given speed and no acceleration or deceleration is caused in the vehicle. However, the accelerator position with the partial equivalent amount varies depending on a setting value in the accelerator position-torque table as described in FIG. 3, and therefore, when the setting value of the accelerator position-torque table is changed, the accelerator position with the partial equivalent amount also changes along with this.

Further, in the above description, when the accelerator operation amount is less than the predetermined value and the electrically driven vehicle is just before stop, the motor torque command value Tm* converges to the corrected disturbance-torque estimated value Td along with the decrease of the rotation speed of the electric motor 4. However, the speed parameter such as a wheel speed, a vehicle-body speed, or a rotation speed of the drive shaft is proportional to the rotation speed of the electric motor 4, and therefore, the motor torque command value Tm* may converge to the disturbance-torque estimated value Td along with the decrease of the speed parameter proportional to the rotation speed of the electric motor 4. Note that, in the first place, the stop control may not necessarily be performed just before stop of the vehicle, and the stop control process in step S203 in FIG. 2 may be omitted.

The present application claims priority to Japanese Patent Application No. 2017-010568 filed on Japanese Patent Office on Jan. 24, 2017, and the contents of this application are incorporated herein by reference in their entirety.

The invention claimed is:

1. A control method for an electrically driven vehicle including a motor configured to supply the vehicle with a braking force or a driving force corresponding to an accelerator operation amount, the control method being for controlling the braking force when the accelerator operation amount is less than a predetermined value and controlling the driving force when the accelerator operation amount is the predetermined value or more, the control method comprising:
    calculating a torque target value at which the motor is caused to output a braking torque or a driving torque corresponding to the accelerator operation amount;
    estimating a disturbance torque acting on the motor as a resistance corresponding to a road surface gradient;
    performing a correction to remove the disturbance torque from the torque target value;
    controlling the motor in accordance with the torque target value subjected to the correction; and
    reducing a correction amount in the correction on a downhill road only when the accelerator operation amount is less than the predetermined value and a vehicle speed is larger than a predetermined vehicle speed.

2. The control method for the electrically driven vehicle, according to claim 1, wherein
    the predetermined vehicle speed has a value an absolute value which is larger than zero.

3. The control method for the electrically driven vehicle, according to claim 1, wherein,
    on the downhill road, when the accelerator operation amount is less than the predetermined value and the vehicle speed is larger than the predetermined vehicle speed, a ratio to reduce the correction amount is decreased as the vehicle speed decreases.

4. The control method for the electrically driven vehicle, according to claim 1, wherein:
    a rotation speed of the motor or a speed parameter proportional to the rotation speed is detected; and
    when the vehicle speed becomes a stop-control-start vehicle speed or less, the motor is controlled without reducing the correction amount so that a motor torque converges to the disturbance torque along with a decrease of the rotation speed of the motor or the speed parameter.

5. The control method for the electrically driven vehicle, according to claim 4, wherein
that the vehicle speed is the stop-control-start vehicle speed or less indicates that the vehicle is just before a stop and the rotation speed of the motor or the speed parameter is smaller than a default value determined in advance.

6. A control device for an electrically driven vehicle, the control device being applied to the electrically driven vehicle including a motor configured to supply the vehicle with a braking force or a driving force corresponding to an accelerator operation amount, the control device being for controlling the braking force when the accelerator operation amount is less than a predetermined value and controlling the driving force when the accelerator operation amount is the predetermined value or more, the control device being configured to:
calculate a torque target value at which the motor is caused to output a braking torque or a driving torque corresponding to the accelerator operation amount;
estimate a disturbance torque acting on the motor as a resistance corresponding to a road surface gradient;
perform a correction to remove the disturbance torque from the torque target value;
control the motor in accordance with the torque target value subjected to the correction; and
reduce a correction amount in the correction on a downhill road only when the accelerator operation amount is less than the predetermined value and a vehicle speed is larger than a predetermined vehicle speed.

* * * * *